(12) United States Patent
Kim et al.

(10) Patent No.: US 11,975,971 B2
(45) Date of Patent: May 7, 2024

(54) METHODS OF FORMING GRAPHENE AND GRAPHENE MANUFACTURING APPARATUSES

(71) Applicant: Samsung Electronics Co., Ltd., Suwon-si (KR)

(72) Inventors: Sangwon Kim, Seoul (KR); Kyung-Eun Byun, Seongnam-si (KR); Hyeonjin Shin, Suwon-si (KR); Eunkyu Lee, Yongin-si (KR); Changseok Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 480 days.

(21) Appl. No.: 17/190,852

(22) Filed: Mar. 3, 2021

(65) Prior Publication Data
US 2021/0276873 A1    Sep. 9, 2021

(30) Foreign Application Priority Data
Mar. 4, 2020    (KR) .......................... 10-2020-0027216

(51) Int. Cl.
*B32B 9/00*    (2006.01)
*C01B 32/186*    (2017.01)
*B82Y 30/00*    (2011.01)

(52) U.S. Cl.
CPC .............. *C01B 32/186* (2017.08); *B82Y 30/00* (2013.01); *Y10T 428/30* (2015.01)

(58) Field of Classification Search
CPC ....... C23C 16/26; Y10T 428/30; B82Y 30/00; B82Y 40/00; C01B 32/186

USPC ........................................................ 428/408
See application file for complete search history.

(56) References Cited

U.S. PATENT DOCUMENTS

| 2014/0103960 A1* | 4/2014 | Yamazaki .......... H03K 19/0013 326/41 |
| 2017/0029942 A1 | 2/2017 | Matsumoto |
| 2019/0044143 A1 | 2/2019 | Joo et al. |
| 2019/0161351 A1 | 5/2019 | Song et al. |

(Continued)

FOREIGN PATENT DOCUMENTS

| JP | 5851804 B2 | 2/2016 |
| JP | 2017-066506 A | 4/2017 |

(Continued)

*Primary Examiner* — Daniel H Miller
(74) *Attorney, Agent, or Firm* — Harness, Dickey & Pierce, P.L.C.

(57) ABSTRACT

A graphene manufacturing apparatus includes a reaction chamber a substrate supporter configured to structurally support a substrate inside the reaction chamber; a plasma generator configured to generate a plasma inside the reaction chamber; a first gas supply configured to supply an inert gas into the reaction chamber at a first height from an upper surface of the substrate supporter in a height direction of the reaction chamber; a second gas supply configured to supply a carbon source into the reaction chamber at a second height from the upper surface of the substrate supporter in the height direction of the reaction chamber; and a third gas supply configured to supply a reducing gas into the reaction chamber, wherein the first to third gas supply units are disposed at different heights at a third height from the upper surface of the substrate supporter in the height direction of the reaction chamber.

20 Claims, 6 Drawing Sheets

(56) References Cited

U.S. PATENT DOCUMENTS

2020/0105524 A1   4/2020   Shin et al.
2020/0140279 A1   5/2020   Shin et al.

FOREIGN PATENT DOCUMENTS

| KR | 10-1238450 B1   | 2/2013 |            |
|----|-----------------|--------|------------|
| KR | 20160104895   * | 6/2016 | C01B 32/186 |
| KR | 10-1717476 B1   | 3/2017 |            |
| KR | 10-2018-0071147 A | 6/2018 |          |
| KR | 10-2019-0063369 A | 6/2019 |          |
| KR | 10-2020-0037638 A | 4/2020 |          |
| KR | 10-2020-0052125 A | 5/2020 |          |

* cited by examiner the upper surface of the substrate supporter in the height direction of the reaction chamber. The first height may be greater than the second height, and the second height is greater than the third height.

METHODS OF FORMING GRAPHENE AND GRAPHENE MANUFACTURING APPARATUSES

CROSS-REFERENCE TO RELATED APPLICATION

This application claims the benefit, under 35 U.S.C. § 119, of Korean Patent Application No. 10-2020-0027216, filed on March 4, 2020, in the Korean Intellectual Property Office, the disclosure of which is incorporated herein in its entirety by reference.

BACKGROUND

1. Field

The present disclosure relates to methods of forming graphene and graphene manufacturing apparatuses, and more particularly, to methods of directly forming graphene on a non-catalyst substrate and apparatuses for manufacturing graphene by using plasma.

2. Description of Related Art

In the field of semiconductor devices, research on graphene has been actively conducted to solve problems of increased resistance due to a decrease in a width of metal wirings and a need to develop new metal barrier materials. Graphene is a crystalline material having a hexagonal honeycomb structure in which carbon atoms are two-dimensionally connected to one another. Graphene has a very small thickness at an atomic size level. Compared to silicon (Si), graphene has advantages of high electric mobility, excellent thermal characteristics, chemical stability, wide surface area, etc.

Plasma apparatuses are used to directly grow graphene on a substrate. In a process of using a plasma apparatus, damage may occur on an outer wall of a housing of the plasma apparatus. Impurities, such as fine particles, may be generated by damage on the outer wall of the housing. These impurities may be deposited on the substrate and may cause cracks, pinholes, or overlayers during graphene growing.

SUMMARY

Provided are methods of forming graphene, including directly growing graphene on a non-catalyst substrate and graphene manufacturing apparatuses.

Additional aspects will be set forth in part in the description which follows and, in part, will be apparent from the description, or may be learned by practice of some example embodiments of the disclosure.

According to some example embodiments, a graphene manufacturing apparatus may include a reaction chamber, a substrate supporter inside the reaction chamber, the substrate supporter configured to structurally support a substrate inside the reaction chamber, a plasma generator configured to generate a plasma inside the reaction chamber, a first gas supply configured to supply an inert gas into the reaction chamber at a first height from an upper surface of the substrate supporter in a height direction of the reaction chamber, a second gas supply configured to supply a carbon source into the reaction chamber at a second height from the upper surface of the substrate supporter in the height direction of the reaction chamber, and a third gas supply configured to supply a reducing gas into the reaction chamber at a third height from the upper surface of the substrate supporter in the height direction of the reaction chamber. The first height may be greater than the second height, and the second height is greater than the third height.

A ratio of the third height to the second height may be greater than 0 and less than about 0.9.

The third gas supply may be configured to supply the reducing gas into the reaction chamber at a flow rate that is greater than or equal to about 0.1 sccm and less than or equal to about 100 sccm.

The reducing gas may include hydrogen gas.

The plasma generator may include a radio frequency (RF) plasma generator or a microwave (MW) plasma generator.

The second gas supply may include an injection plate that traverses an interior of the reaction chamber.

The third gas supply may include a plurality of nozzles spaced apart from each other at particular intervals along a sidewall of the reaction chamber.

The carbon source may include a hydrocarbon having an ionization energy of equal to or less than about 10.6 eV.

The first gas supply may include a shower ring extending in a ring shape along a sidewall of the reaction chamber.'

The graphene manufacturing apparatus may further include processing circuitry configured to control the flow rate of the reducing gas, wherein the reducing gas has a laminar flow at the flow rate.

The graphene manufacturing apparatus may further include a heater configured to generate heat that is transmitted to the substrate structurally supported by the substrate supporter.

According to some example embodiments, a method of forming graphene based on using the graphene manufacturing apparatus may include placing a non-catalyst substrate inside the reaction chamber such that the non-catalyst substrate is structurally supported on the upper surface of the substrate supporter, the non-catalyst substrate including a material that is configured to not act as a catalyst for growing graphene. The method may include pre-treating a surface of the non-catalyst substrate based on supplying the reducing gas into the reaction chamber. The method may include directly growing graphene on a surface of the non-catalyst substrate based on supplying the carbon source, the inert gas, and the reducing gas into the reaction chamber in a plasma enhanced chemical vapor deposition (PECVD) process that includes generating a plasma inside the reaction chamber. The reducing gas may have an ionization energy equal to or less than about 10.6 eV.

A ratio of the third height to the second height may be greater than 0 and less than 0.9.

The reducing gas may be supplied to the reaction chamber at a flow rate that is greater than or equal to about 0.1 sccm and less than or equal to about 100 sccm.

The reducing gas may include a hydrogen gas.

The plasma may be generated based on using a radio frequency (RF) plasma generator or a microwave (MW) plasma generator.

The non-catalyst substrate may include at least one of a Group IV semiconductor material, a semiconductor compound, a metal, or an insulating material.

The pre-treating of the surface of the non-catalyst substrate may include forming at least one of charges or an activation site that induces adsorption of activated carbon on the surface of the non-catalyst substrate.

The directly growing of graphene may be performed at a pressure equal to or less than about 10 Torr.

The directly growing of graphene may be performed at a process temperature equal to or less than about 700° C.

According to some example embodiments, a method for forming graphene may include placing a non-catalyst substrate inside a reaction chamber such that the non-catalyst substrate is structurally supported on an upper surface of a substrate supporter inside the reaction chamber, the non-catalyst substrate including a material that is configured to not act as a catalyst for growing graphene. The method may include pre-treating a surface of the non-catalyst substrate based on supplying a reducing gas into the reaction chamber, wherein the reducing gas has an ionization energy equal to or less than about 10.6 eV. The method may include directly growing graphene on a surface of the non-catalyst substrate based on supplying a carbon source, an inert gas, and the reducing gas into the reaction chamber in a plasma enhanced chemical vapor deposition (PECVD) process that includes generating a plasma inside the reaction chamber.

The inert gas may be supplied into the reaction chamber at a first height from the upper surface of the substrate supporter in a height direction of the reaction chamber. The carbon source may be supplied into the reaction chamber at a second height from the upper surface of the substrate supporter in the height direction of the reaction chamber. The reducing gas may be supplied into the reaction chamber at a third height from the upper surface of the substrate supporter in the height direction of the reaction chamber.

A ratio of the third height to the second height may be greater than 0 and less than 0.9.

The reducing gas may be supplied to the reaction chamber at a flow rate that is greater than or equal to about 0.1 sccm and less than or equal to about 100 sccm.

The reducing gas may include a hydrogen gas.

The plasma may be generated based on using a radio frequency (RF) plasma generator or a microwave (MW) plasma generator.

The non-catalyst substrate may include at least one of a Group IV semiconductor material, a semiconductor compound, a metal, or an insulating material.

The pre-treating of the surface of the non-catalyst substrate may include forming at least one of charges or an activation site that induces adsorption of activated carbon on the surface of the non-catalyst substrate.

The directly growing of graphene may be performed at a pressure equal to or less than about 10 Torr.

The directly growing of graphene may be performed at a process temperature equal to or less than about 700° C.

BRIEF DESCRIPTION OF THE DRAWINGS

The above and other aspects, features, and advantages of some example embodiments of the disclosure will be more apparent from the following description taken in conjunction with the accompanying drawings, in which.

DETAILED DESCRIPTION

Figure 1:
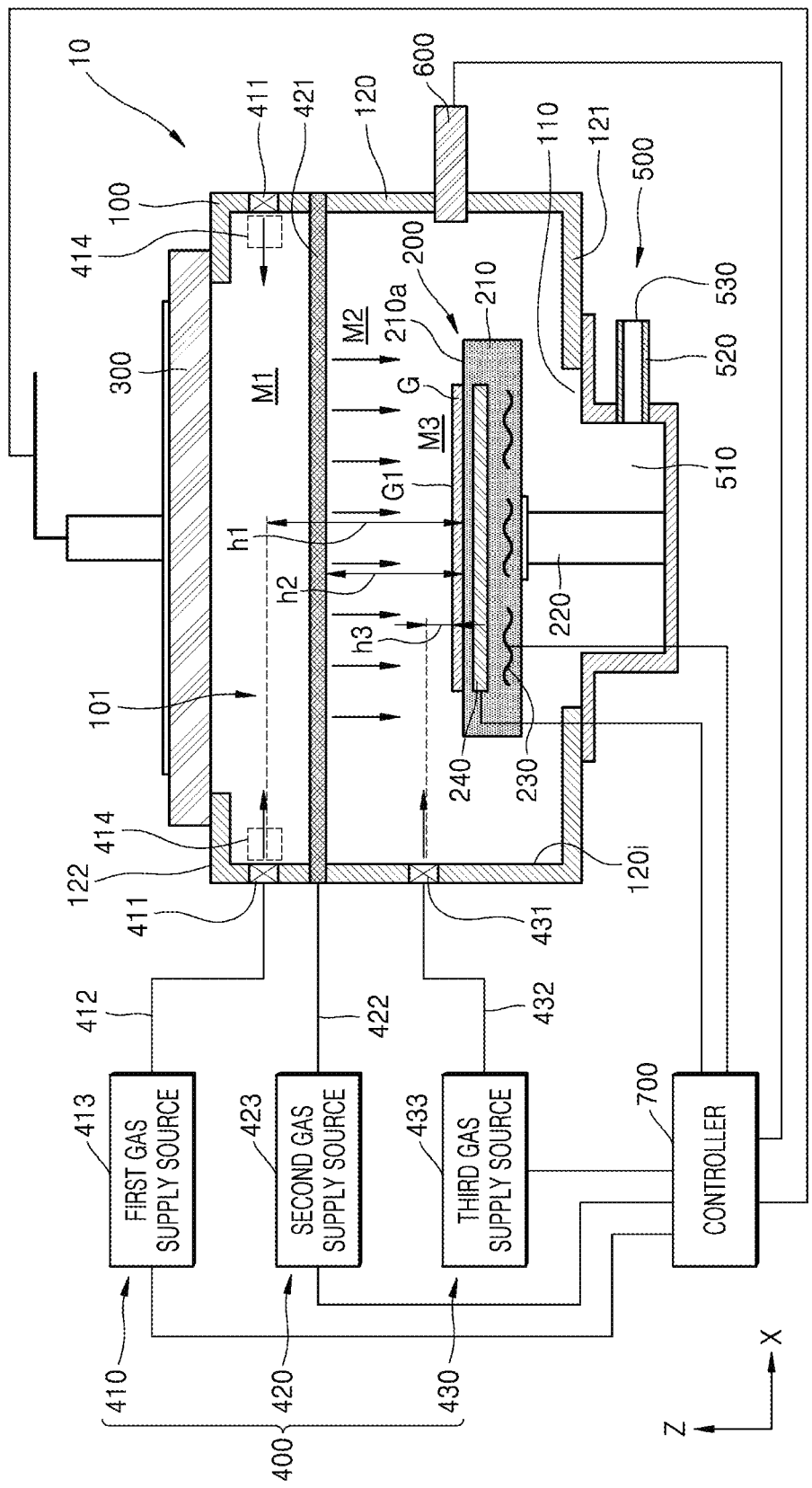
FIG. 1 is a schematic diagram of a graphene manufacturing apparatus according to some example embodiments.

Reference will now be made in detail to example embodiments, some example embodiments of which are illustrated in the accompanying drawings, wherein like reference numerals refer to like elements throughout and sizes of constituent elements may be exaggerated for convenience of explanation and the clarity of the specification. In this regard, some example embodiments may have different forms and should not be construed as being limited to the descriptions set forth herein. Accordingly, some example embodiments are merely described below, by referring to the figures, to explain aspects. As used herein, the term "and/or" includes any and all combinations of one or more of the associated listed items (e.g., A, B, and C). Expressions such as "at least one of," when preceding a list of elements, modify the entire list of elements and do not modify the individual elements of the list. For example, "at least one of A, B, and C," and "at least one of A, B, or C" may be construed as covering any one of the following combinations: A; B; A and B; A and C; B and C; and A, B, and C."

Hereinafter, some example embodiments will be described in detail with reference to the accompanying drawings. In the drawings, like reference numerals refer to like elements and sizes of elements in the drawings may be exaggerated for convenience of explanation. Some example embodiments of the inventive concepts are capable of various modifications and may be embodied in many different forms.

When an element or layer is referred to as being "on" or "above" another element or layer, the element or layer may be directly on another element or layer or intervening elements or layers. Singular forms are intended to include the plural forms as well, unless the context clearly indicates otherwise. It should be understood that, when a part "comprises" or "includes" an element in the specification, unless otherwise defined, other elements are not excluded from the part and the part may further include other elements. The term "above" and similar directional terms may be applied to both singular and plural.

In some example embodiments, graphene (nanocrystalline graphene) and methods of directly growing the graphene on a surface of a non-catalyst substrate via a plasma enhanced chemical vapor deposition (PECVD) process will be described.

It will be understood that elements and/or operations may be recited herein as being "the same" as other elements and/or operations, and it will be further understood that elements and/or operations recited herein as being "the same" as other elements and/or operations may be "the same" or "substantially the same" as the other elements and/or operations. Elements and/or operations that are "substantially the same" as other elements and/or operations will be understood to include elements and/or operations that are the same as the other elements and/or operations within manufacturing tolerances and/or material tolerances. Elements and/or operations that are the same or substantially the same as other elements and/or operations may be structurally the same or substantially the same, functionally the same or substantially the same, and/or compositionally the same or substantially the same.

It will be understood that elements and/or operations described herein as being "substantially" the same encompasses elements and/or operations that are the same within manufacturing tolerances and/or material tolerances and/or elements and/or operations that have one or more properties (e.g., length, composition, etc.) with a relative difference in magnitude that is equal to or less than 10%. Further, regardless of whether elements and/or operations are modified as "substantially," it will be understood that these elements and/or operations should be construed as including a manufacturing or operational tolerance (e.g., ±10%) around the stated elements and/or operations.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Figure 6:
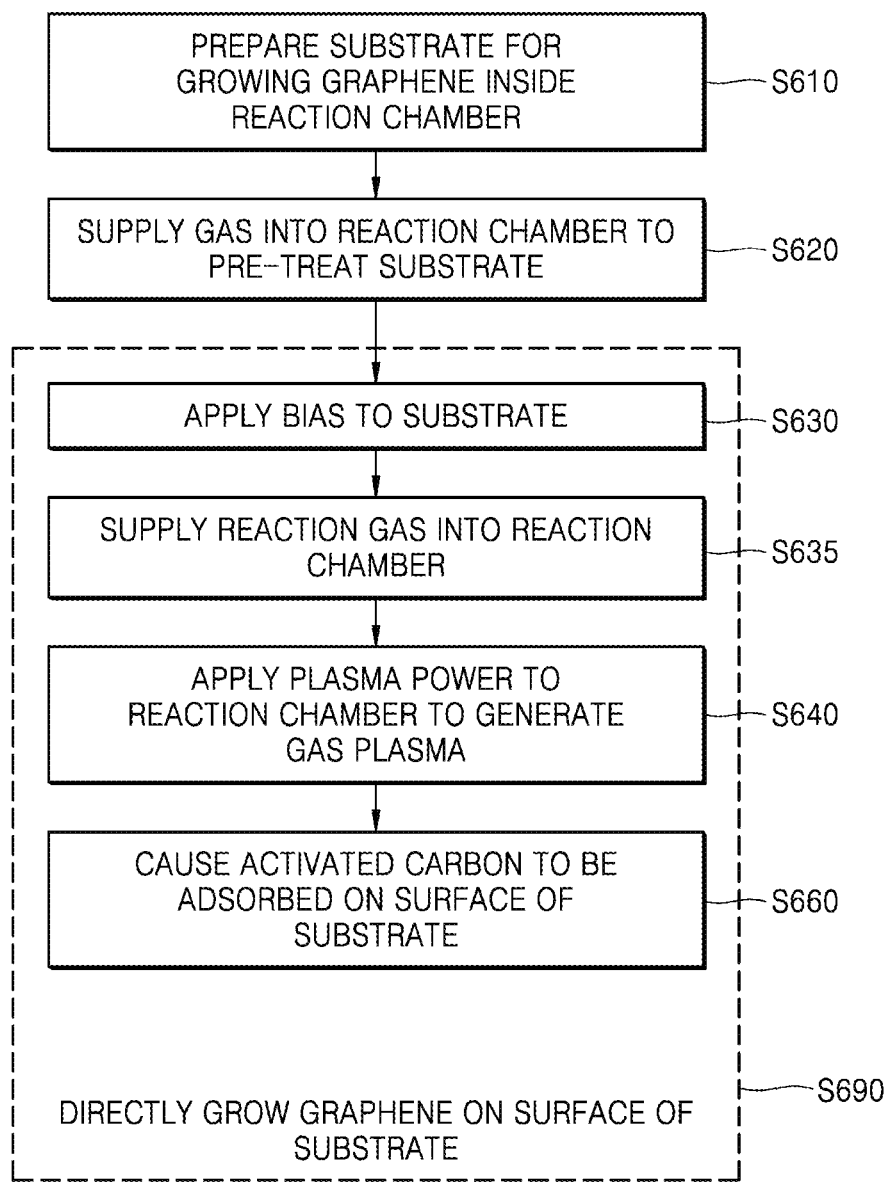
FIG. 6 is a flowchart of a method of forming graphene according to some example embodiments.

FIG. 1 is a schematic diagram of a graphene manufacturing apparatus 10 according to some example embodiments. FIG. 6 is a flowchart of a method of forming graphene according to some example embodiments.

Referring to FIG. 1, the graphene manufacturing apparatus 10 according to some example embodiments may include a reaction chamber 100, a substrate supporter 200, a plasma generator 300, a gas supply unit 400, and a gas discharge unit 500. The reaction chamber 100 according to some example embodiments may be provided as a cylindrical shape structure having a receiving unit in an inner space (e.g., interior 101) thereof. The reaction chamber 100 may be a structure having at least an upper wall 122 at least partially defining an upper boundary of an interior 101 of the reaction chamber 100, a lower wall 121 at least partially defining a lower boundary of the interior 101 of the reaction chamber 100, and a sidewall 120 that has an inner surface 120i defining at least side boundaries of the interior 101 of the reaction chamber 100. As an example, the structure of the reaction chamber 100 may include, for example, a metal material, such as aluminum or an alloy thereof, or stainless steel. Also, the reaction chamber 100 may be provided in a grounded (e.g., electrically grounded) state. Restated, the reaction chamber 100 may be connected to an electrical ground. The reaction chamber 100 according to some example embodiments may include an opening 110 extending through a lower wall 121 thereof, and a gas discharge unit 500 (e.g., gas outlet, which will be described later, may be connected to the opening 110. Also, one or more gas supply holes that may be connected to the gas supply unit 400 and a substrate opening 600 for taking in and out of the substrate may be disposed on (e.g., may extend partially or entirely through a thickness of) a sidewall 120 of the reaction chamber 100.

The substrate supporter 200 may be a member (e.g., a structure) inside the reaction chamber 100 for supporting the substrate G on which graphene may grow. Restated, the substrate supporter 200 may be configured to structurally support (e.g., support the load, or weight) of the substrate G and any graphene grown thereon inside the reaction chamber 100. As an example, the substrate G that may be supported (e.g., structurally supported) on the substrate supporter 200 is a non-catalyst substrate, and may be a substrate that includes a material other than a material that acts as a catalyst for growing graphene. For example, the substrate G may be a substrate that does not include a metal. The substrate G may include at least one of a Group IV semiconductor material, a semiconductor compound, or an insulating material. As a specific example, the Group IV semiconductor material may include Si, Ge, or Sn. In addition, the semiconductor compound may include a material in which at least two elements of, for example, Si, Ge, C, Zn, Cd, Al, Ga, In, B, C, N, P, S, Se, As, Sb and Te are combined.

The insulating material may include at least one of Si, Al, Hf, Zr, Zn, Ti, Ta, W, or Mn or at least one oxide, nitride, carbide of at least one of Si, Ni, Al, W, Ru, Co, Mn, Ti, Ta, Au, Hf, Zr, Zn, Y, Cr, Cu, Mo, or Gd, or a derivative of the oxide, nitride, and carbide. At least one of the oxide, nitride, carbide, or a derivative thereof may further include H. The substrate G may further include a dopant. The materials for forming the substrate G described above are examples, and the substrate G may include a material that does not act as a catalyst for growing graphene.

Also, the substrate supporter 200 according to some example embodiments may include a stage 210 (e.g., pedestal) capable of supporting (e.g., configured to structurally support) the substrate G inside the reaction chamber 100, a supporting axis 220 disposed on a lower side of the stage 210 (e.g., configured to structurally support the stage 210 inside the reaction chamber 100, a heating unit 230 (e.g., heater) inserted in the stage 210 (e.g., located partially or entirely within an interior of the stage 210 and thus partially or completely isolated from exposure to the interior 101 external from the stage 210), and a bias electrode unit 240 (also referred to as a bias electrode). As an example, the stage 210 may be provided in (e.g., may have) a plate shape corresponding to the shape of the substrate G and may include a supporting unit (not shown) capable of fixing the position of the substrate G on an upper surface 210a of the stage 210. For example, the stage 210 may include ceramics, such as AlN, but some example embodiments are not limited thereto. Also, a lifting pin (not shown) for lifting and lowering the substrate G may be disposed inside the stage 210 (e.g., within a volume defined by outer surfaces, including upper surface 210a, of the stage 210) to protrude and depress against the upper surface 210a of the stage 210. In some example embodiments, the upper surface 210a of the stage 210 may be understood to be an upper surface of the substrate supporter 200.

The supporting axis 220 may extend in a direction (Z direction) to support (e.g., structurally support) the stage 210 within the reaction chamber 100. As an example, the supporting axis 220 may move the stage 210 up and down in the direction (Z direction) inside the reaction chamber 100.

The heating unit 230 (e.g., heater) may be a heating member (e.g., a heating element, including a resistive heater that includes a wire configured to generate heat based on an electrical current passing therethrough) configured to generate heat that may be transmitted to the substrate G supported (e.g., on upper surface 210a) by the substrate supporter 200 (e.g., directly or through at least an intervening portion of the stage 210 material), such that the heating unit 230 may be understood to be configured to apply heat to the substrate G (e.g., the heating unit 230 may be configured to heat the substrate G supported by the substrate supporter 200). As an example, the heating unit 230 may be disposed inside the stage 210 (e.g., within a volume defined by outer surfaces of the stage 210, such that the heating unit 230 is partially or completely isolated from exposure to an exterior of the stage 210 by at least some material comprising the stage 210). Accordingly, the substrate G may be disposed above the heating unit 230 and may be in direct contact with the heating unit or may be isolated from direct contact with the heating unit 230 by at least some of the material comprising the stage 210. The heating unit 230 according to some example embodiments may receive power from a heating power source (not shown) to heat the substrate G to a process temperature. As an example, the process temperature for growing graphene may be approximately 700° C. or less than a temperature used in a chemical vapor deposition process. For example, the process temperature for growing graphene may be greater than about 200° C. and less than about 700° C. As shown, the bias electrode unit 240 may be within the interior of the stage 210 and may be between the upper surface 210a and the heating unit 230, but example embodiments are not limited thereto.

The bias electrode unit 240 may apply a bias to the substrate G. As an example, the bias electrode unit 240 may be disposed inside the stage 210. Also, the bias electrode unit 240 may be provided in a shape corresponding to the shape of the substrate G. The bias applied to the substrate G may be, for example, an RF bias or a DC bias by using the bias electrode unit 240 according to some example embodiments. Accordingly, a particular (or, in some example embodiments, predetermined) (+) bias voltage or a particular (or, in some example embodiments, predetermined) (−) bias voltage may be applied to the substrate G by the bias electrode unit 240. To this end, a bias power of a particular (or, in some example embodiments, predetermined) size may be applied to the substrate G. For example, the bias power applied to the substrate G in a pretreatment process of the substrate G may be in a range of about 1 W to about 300 W. However, this is merely an example, and the bias power applied to the substrate G may be variously modified.

The plasma generator 300 according to some example embodiments may be coupled to the upper wall 122 of the reaction chamber 100 and may be exposed to the interior 101 via an opening in the upper wall 122. The plasma generator 300 may be configured to apply power to the reaction chamber 100 for generating plasma inside the reaction chamber 100. Restated, the plasma generator 300 may be configured to generate a plasma inside the reaction chamber 100. Here, the power for generating plasma may be in a range of about 10 W to about 4000 W. However, some example embodiments are not limited thereto.

As the plasma generator 300, for example, a radio frequency (RF) plasma generator or a MW (microwave) plasma generator may be used, but example embodiments are not limited thereto. Restated, the plasma-enhanced chemical vapor deposition (PECVD) process may utilize a plasma that may be generated based on using a radio frequency (RF) plasma generator or a microwave (MW) plasma generator. Here, in order to grow graphene, the RF plasma generator may generate an RF plasma having a frequency in a range of, for example, about 3 MHz to about 100 MHz, and the MW plasma generator may generate an MW plasma having a frequency in a range of, for example, about 0.7 GHz to about 2.5 GHz. However, the frequency range is merely an example, and other frequency ranges besides the above range may be used. A plurality of RF plasma generators or a plurality of MW plasma generators may be used as the plasma power source.

When power for plasma generation is applied (e.g., supplied) to the reaction chamber 100 from the plasma generator 300, an electric field may be induced inside the reaction chamber 100. As described above, when an electric field is induced in a state that a reaction gas is injected, plasma for growing graphene may be formed (e.g., formed within the interior 101).

The gas supply unit 400 may include a first gas supply unit 410 (also referred to herein as a first gas supply), a second gas supply unit 420 (also referred to herein as a second gas supply), and a third gas supply unit 430 (also referred to herein as a third gas supply). Each gas supply unit may include a gas supply tank including a particular gas of the first gas, second gas, or third gas and a control valve configured to selectively and/or adjustably open or close to control a supply of the particular gas out of the gas supply tank. Each gas supply tank may hold the particular gas under pressure (e.g., pressurized), for example pressurized by an inert pressuring gas (e.g., helium gas). The first gas supply unit 410 according to some example embodiments is a gas supply device that may supply an inert gas into the reaction chamber 100. For example, the first gas supply unit 410 may include a shower ring arranged in a ring shape along a sidewall 120 of the reaction chamber 100. For example, the first gas supply unit 410 may include a ring-shaped structure 414 (e.g., nozzle ring structure) that extends around an inner surface 120i of the sidewall 120 within the interior 101 of the reaction chamber 100. The ring-shaped structure 414 may include a hollow interior with one or more outlets, or nozzles, that extend through upper, inner-side, and/or lower portions of the ring-shaped structure 414 to establish gas flow communication from the hollow interior to the interior 101 of the reaction chamber 100. The ring-shaped structure 414 may include one or more inlets connected to the first gas discharge holes 411 and thus establishing gas flow communication from the first gas supply source 413 to the hollow interior of the ring-shaped structure 414. According to some example embodiments, the first gas supply unit 410 may be disposed between an upper wall 122 of the reaction chamber 100 and the second gas supply unit 420, which will be described later. The first gas supply unit 410 may include a first gas discharge hole 411 and a first gas supply path 412 (also referred to as a first gas supply conduit) connected at one end to the first gas discharge hole 411. A first gas supply source 413 (e.g., a control valve thereof) may be connected to an opposite end of the first gas supply path 412. An inert gas, for example, Ar, He, Ne, Kr, Xe, etc. may be accommodated in the first gas supply source 413. In some example embodiments, Ar, which may stably generate plasma, is used as an inert gas supplied from the first gas supply source 413.

The second gas supply unit 420 is a gas supply device that may supply a carbon source into the reaction chamber 100. For example, the second gas supply unit 420 may include an injection plate 421 disposed to traverse an interior 101 of the reaction chamber 100 (e.g., in a direction and/or plane (e.g., X-direction) that is perpendicular or substantially perpendicular to the height direction (e.g., Z-direction)) and may partially or completely divide (e.g., partition) said interior 101 into two separate interior spaces at least partially defined by the injection plate 421 and separate portions of the sidewalls 120 of the reaction chamber 100. As shown in FIG. 1, the injection plate 421 may extend through a thickness of the sidewall(s) 120 of the reaction chamber 100 such that some or all side edges of the injection plate 421 are exposed to an exterior of the reaction chamber 100. According to some example embodiments, the injection plate 421 may include a gas flow path (e.g., gas flow conduit) formed inside the lattice-shaped body portion and a plurality of gas discharge holes communicated with the gas flow path and opened to face the stage 210.

The gas flow path (e.g., gas flow conduit) of the injection plate 421 may be connected to a gas supply path 422 (e.g., gas supply conduit) extending from a sidewall 120 of the reaction chamber 100. The gas supply path 422 may be connected to a second gas supply source 423, also referred to as a carbon source supply source (e.g., a control valve thereof) to deliver a carbon source to the injection plate 421. As an example, a carbon source included (e.g., held) in the second gas supply source 423, and which the second gas supply unit 420 may be configured to supply into the reaction chamber 100, may include a hydrocarbon having an ionization energy of equal to or less than about 10.6 eV. In some example embodiments, the hydrocarbon may include at least one of benzene, toluene, meta-xylene, propane, propene, butane, hexane, octane, cyclohexane, oxygen, nitrogen, sulfur, or phosphor. In some example embodiments, the hydrocarbon may include a liquid precursor which is in a liquid state at room temperature (e.g., about 20° C. to about 25° C. at about 1 atmosphere). In addition, the liquid precursor may be a molecular precursor containing one or more aromatic molecular rings, such as benzene, toluene, xylene, methylene, etc. or may be a precursor in which a functional group is included in a molecule having one or more aromatic molecular rings, such as chlorobenzene and anisole. In some example embodiments, the carbon source may include a molecular precursor including three or more aliphatic carbon bonds, such as propane, propene, butane, hexane, octane, cyclohexane, etc. and a precursor including a functional group, such as oxygen, nitrogen, and sulfur, etc. However, the carbon source is an example, and may be any hydrocarbon having an ionization energy of about 10.6 eV or less (e.g., between about 1.2 eV and about 10.6 eV). In some example embodiments, the carbon source may include at least one of benzene, toluene, meta-xylene, propane, propene, butane, hexane, octane, cyclohexane, oxygen, nitrogen, sulfur, or phosphor.

The third gas supply unit 430 is a gas supply device that may supply a reducing gas into the reaction chamber 100. For example, the third gas supply unit 430 may include a plurality of nozzle units 431, also referred to herein as nozzles, arranged to be separated from each other (e.g., spaced apart from each other) along a sidewall of the reaction chamber 100, for example the nozzle units 431 may extend through a thickness of the reaction chamber 100 (e.g., a thickness of the sidewall 120) to the interior 101 such that the outlets of the nozzle units 431 are at a same or substantially same height (e.g., third height $h_3$) from the upper surface 210a in the height direction (e.g., Z-direction) and may be spaced apart from each other in a direction that is perpendicular or substantially perpendicular to the height direction (e.g., spaced apart in the X-direction). Where the reaction chamber 100 is a cylindrical structure, such that the sidewall 120 defines the cylindrical sidewalls of the cylindrical structure, the nozzle units 431 may be understood to be spaced apart from each other around at least a portion of a circumference of at least the inner surface 120i of the sidewall 120 of the reaction chamber 100. The nozzle units 431 may be spaced apart from each other at one or more particular intervals, e.g., at a single, fixed spacing interval distance. According to some example embodiments, the third gas supply unit 430 may be disposed between the injection plate 421 and the substrate supporter 200. The third gas supply unit 430 may include a third gas supply path 432 connected to the plurality of nozzle units 431. A third gas supply source 433 may be connected to the third gas supply path 432. The third gas supply source 433 may include a reducing gas (also referred to as a reduced gas), which may be a gas with a low oxidation number (e.g., an oxidation number of −1) or high reduction, for example, at least one of hydrogen, nitrogen, chlorine, fluorine, ammonia, or derivatives thereof. However, some example embodiments are not limited thereto. In the present disclosure, it is assumed that hydrogen gas is used as the reducing gas.

When the hydrogen gas is injected from the plurality of nozzle units 431 according to some example embodiments, the hydrogen gas moves toward the sidewall of the reaction chamber 100 and collides with the sidewall, and as a result, roughness or defects may be formed on the sidewall of the reaction chamber 100. At this time, fine particles may be generated from the sidewall of the reaction chamber 100. When the fine particles are deposited on an upper surface G1 of the substrate G, overlayers, pin holes, or cracks may be caused in a process of growing a graphene layer.

As an example, the first gas supply unit 410 (e.g., first gas discharge holes 411) may be disposed (e.g., may extend through the sidewall 120) at a first height hi in a height direction (Z direction) of the reaction chamber 100 from the substrate supporter 200 (e.g., from the upper surface 210a of the stage 210), the second gas supply unit 420, more specifically, the injection plate 421 may be disposed inside the reaction chamber 100 at a second height $h_2$ in the height direction (Z direction) of the reaction chamber 100 from the substrate supporter 200 (e.g., from the upper surface 210a of the stage 210), and the third gas supply unit 430, more specifically the plurality of nozzle units 431 may be disposed (e.g., may extend through the sidewall 120) at a third height $h_3$ in the height direction (Z direction) of the reaction chamber 100 from the substrate supporter 200 (e.g., from the upper surface 210a of the stage 210). In this point, the first height $h_1$ may be greater (e.g., greater in magnitude) than the second height $h_2$, and the second height $h_2$ may be greater (e.g., greater in magnitude) than the third height $h_3$. Also, at this point, a ratio of the third height $h_3$ to the second height $h_2$ may be greater than 0 and equal to or less than about 0.9. Accordingly, it will be understood that the first gas supply unit 410 may be configured to supply a first gas (e.g., an inert gas) into the reaction chamber 100 at a first height $h_1$ from an upper surface of the substrate supporter 200 (e.g., upper surface 210a) in a height direction (Z direction) of the reaction chamber 100, the second gas supply unit 420 may be configured to supply a second gas (e.g., a carbon source) into the reaction chamber 100 at a second height $h_2$ from the upper surface of the substrate supporter 200 (e.g., upper surface 210a) in the height direction (Z direction) of the reaction chamber 100, and the third gas supply unit 430 may be configured to supply a third gas (e.g., a reducing gas) into the reaction chamber 100 at a third height $h_3$ from the upper surface of the substrate supporter 200 (e.g., upper surface 210a) in the height direction (Z direction) of the reaction chamber 100, where the first height hi may be greater (e.g., greater in magnitude) than the second height $h_2$, and the second height $h_2$ may be greater (e.g., greater in magnitude) than the third height $h_3$.

However, it will be understood that example embodiments are not limited thereto. For example, in some example embodiments, the first height hi may be smaller (e.g., smaller in magnitude) than the second height $h_2$, such that the first gas supply unit 410 may be configured to supply a gas into the reaction chamber 100 (e.g., into interior 101) at a height between the substrate supporter 200 and a separate height at which the second gas supply unit 420 is configured to supply a separate gas into the reaction chamber 100. In some example embodiments, the second height $h_2$ may be smaller (e.g., smaller in magnitude) than the third height $h_3$. In some example embodiments, the first height $h_1$ may be smaller (e.g., smaller in magnitude) than the third height h3.

According to some example embodiments, the hydrogen gas (e.g., reducing gas) injected from the plurality of nozzle units 431 should contact the substrate G. In some example embodiments, as described above, when the hydrogen gas injected from the plurality of nozzle units 431 moves toward the sidewall of the reaction chamber 100 and collides with the sidewall, unnecessary fine particles may be generated. Accordingly, according to some example embodiments, the plurality of nozzle units 431 may be arranged at the third height $h_3$ at which the contact between the hydrogen gas and the sidewall of the reaction chamber 100 is reduced or minimized while the hydrogen gas is moving toward the substrate G, that is, the plurality of nozzle units 431 may be located at a height at which the ratio of the third height $h_3$ to the second height $h_2$ is greater than 0 and less than 0.9.

Also, according to some example embodiments, a flow rate of the hydrogen gas (e.g., reducing gas) injected from the plurality of nozzle units 431 may be greater than or equal to about 0.1 sccm (standard cubic centimeters per minute) and less than or equal to about 100 sccm. Accordingly, it will be understood that the thrd as supply unit 430 may be configured to supply a reducing gas (e.g,, hydrogen gas) into the reaction chamber 100 at a flow rate that is greater than or equal to about 0.1 sccm and less than or equal to about 100 sccm. At this time, the flow rate of the reducing gas, for example, the hydrogen gas, injected from the plurality of nozzle units 431 may be controlled by using a controller 700. According to some example embodiments, when the hydrogen gas injected from the plurality of nozzle units 431 has a flow rate greater than or equal to about 0.1 sccm or more and less than or equal to about 100 sccm, the hydrogen gas may form a laminar flow. Accordingly, the hydrogen gas injected from the plurality of nozzle units 431 may not come into contact with the sidewall of the reaction chamber 100 located at an upper side than the location of the plurality of nozzle units 431. Accordingly, the generation of unnecessary fine particles may be reduced or minimized by minimizing the contact between the hydrogen gas injected from the plurality of nozzle units 431 and the sidewall of the reaction chamber 100.

The controller 700 may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device, for example a solid state drive (SSD), storing a program of instructions, and a processor configured to execute the program of instructions to implement the functionality of the controller 700, for example to control the formation of graphene using the graphene manufacturing apparatus 10. For example as shown in FIG. 1, the controller 700 may be communicatively coupled to at least the first to third gas supply units 410 to 430, the heating unit 230, the bias electrode unit 240, the substrate opening 600, and the plasma generator 300 and may be configured to control the operation of each of said elements of the graphene manufacturing apparatus 10 to implement methods of forming graphene according to any of the example embodiments as described herein. The controller 700 may control a flow rate of one or more gases from the gas supply unit 400 into the reaction chamber 100 via controlling one or more control valves of one or more of the gas supply units 410 to 430. In some example embodiments, the controller 700 may be configured to control a flow rate of the reducing gas from the first gas supply unit 410 into the interior 101 of the reaction chamber 100, for example to control said flow rate to cause the reducing gas to have a laminar flow into the interior 101 of the reaction chamber 100 from the first gas supply unit 410 (e.g., a laminar flow through the first gas discharge holes 411 and into the interior 101 of the reaction chamber 100.

Accordingly, the interior space of the reaction chamber 100 according to some example embodiments may be divided into three zones. As an example, a first zone M1 between the plasma generator 300 and the injection plate 421 may be a region for introducing an inert gas for generating plasma from the first gas supply unit 410. Accordingly, the first zone M1 may be a plasma generation region mainly for generating plasma.

Also, a second zone M2 between the injection plate 421 and the plurality of nozzle units 431 may be a region for introducing a carbon source used as a raw material for growing graphene from the second gas supply unit 420.

In addition, a third zone M3 between the plurality of nozzle units 431 and the substrate supporter 200 is a region for introducing hydrogen gas used as a reducing gas from the third gas supply unit 430. The third zone M3 is a mixing/diffusion space in which a carbon source as a raw material for growing graphene is mixed with a reducing gas and active species in the plasma are diffused toward the substrate G on the substrate supporter 200. It will be understood however, that the relative positions of the first to third zones M1 to M3 as shown in FIG. 1 are not limited thereto. For example, in some example embodiments the third zone M3 may be between the first zone M1 and the second zone M2. In some example embodiments, the first zone M1 may be between the second zone M2 and the third zone M3.

The gas discharge unit 500 may include an exhaust chamber 510, an exhaust port 520 formed on a side of the exhaust chamber 510, an exhaust pipe 530 connected to the exhaust port 520, and an exhaust device (not shown) connected to the exhaust pipe 530. As an example, the exhaust device (not shown) may be a vacuum pump or a pressure control valve (which may be communicatively coupled to, and thus controlled by, the controller 700) capable of forming negative pressure, but some example embodiments are not limited thereto.

Figure 2:
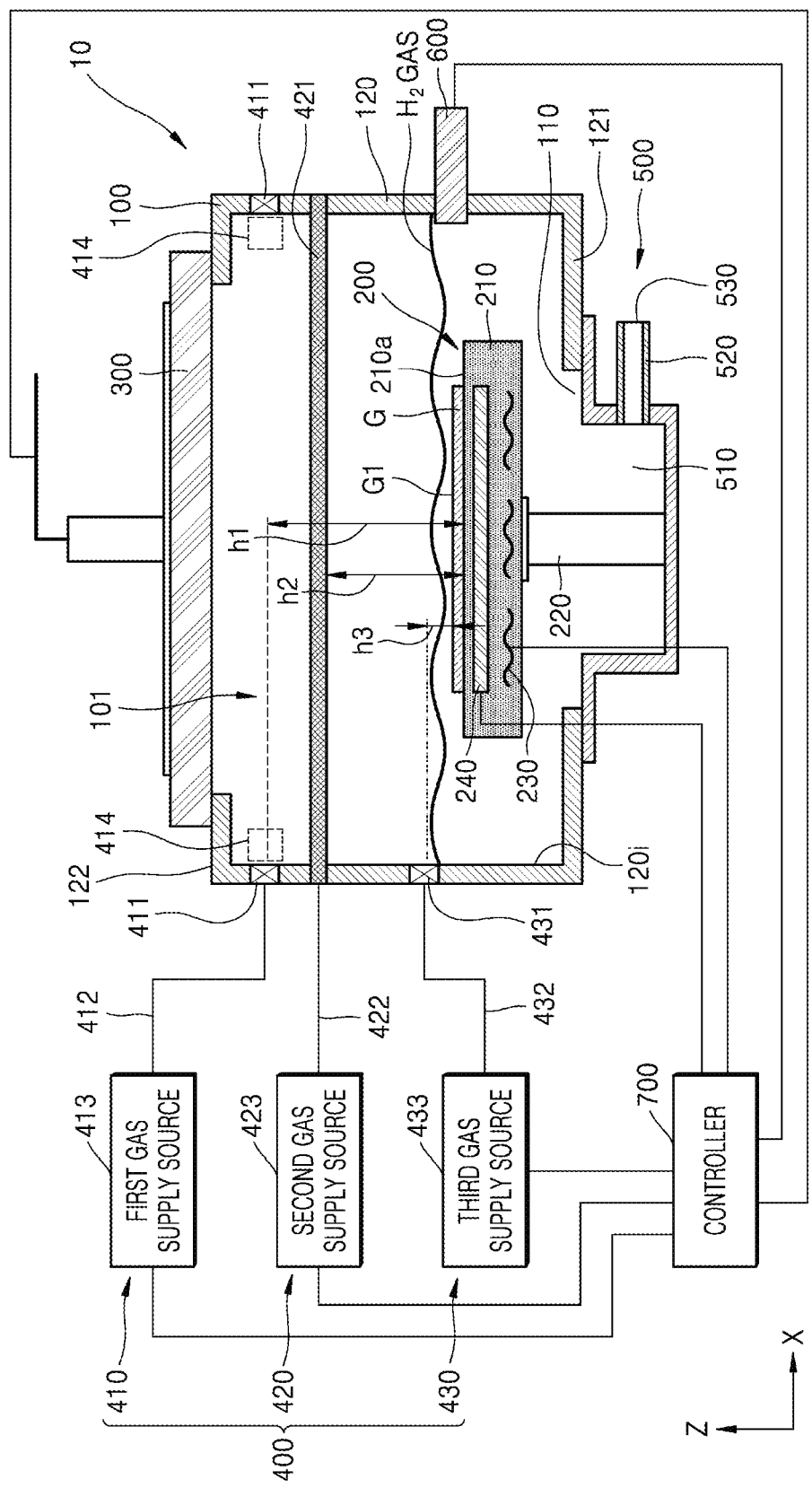
FIG. 2 is a schematic diagram of a graphene manufacturing apparatus according to some example embodiments.
Figure 3A:
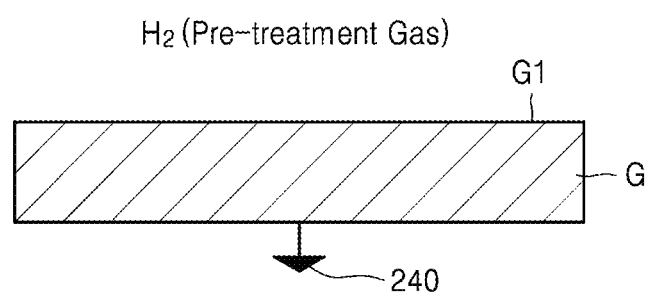
FIGS. 3A and 3B are diagrams for explaining a pretreatment process of graphene according to some example embodiments.
Figure 3B:
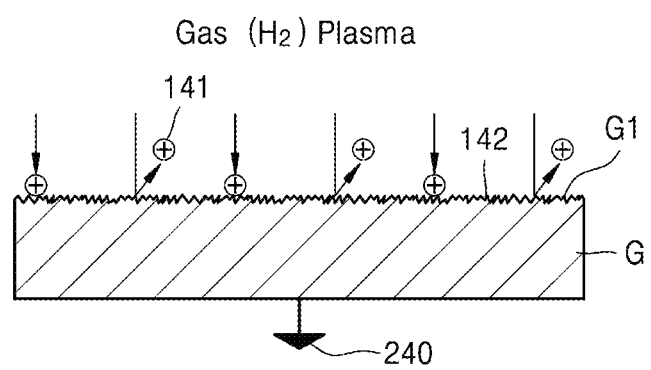

FIG. 2 is a schematic diagram of a graphene manufacturing apparatus according to some example embodiments. FIGS. 3A and 3B are diagrams for explaining a pre-treatment process of graphene according to some example embodiments.

Referring to FIGS. 2 and 3A and 6, a surface G1 of the substrate G may be pretreated by using a reducing gas before growing graphene. The pretreatment process may be performed at a low temperature. For example, the pretreatment process of the substrate G may be performed at a processing temperature of approximately 400° C. or less. In addition, a process pressure at which the pretreatment process of the substrate G is performed may be, for example, lower than a process pressure at which a graphene growing process described below is performed.

The pretreatment process of the substrate G may be performed for the purpose of removing impurities or oxygen remaining on the surface G1 of the substrate G. In some example embodiments, the pretreatment process may generate charges 141 and an activation site 142 that allow activated carbon to be effectively adsorbed to the surface G1 of the substrate G. Hereinafter, a method of generating the charges 141 and the activation site 142 will be described with regard to the method illustrated in FIG. 6. Some or all of the operations of the method shown in FIG. 6 may be controlled and/or implemented based on controller 700 controlling some or all elements of the graphene manufacturing apparatus 10, for example based on processing circuitry of the controller 700 executing a program of instructions stored in a memory of the controller 700.

First, a substrate G for growing graphene inside the reaction chamber 100 according to some example embodiments is prepared (S610). Preparing a substrate G inside the reaction chamber 100 may include placing the substrate G inside the reaction chamber such that the substrate G is resting on (e.g., is directly contacting and is structurally supported on) the upper surface 210a of the stage 210 (e.g., an upper surface of the substrate supporter 200). The substrate G may be placed inside the reaction chamber 100 via being moved into the interior 101 via substrate opening 600, where the substrate G may be manipulated (e.g., by an actuator) to be moved into the reaction chamber 100, and onto the upper surface 210a, through the substrate opening 600. Here, the substrate G may denote a non-catalyst substrate including a material other than a material that acts as a catalyst for growing graphene. Restated, in some example embodiments, the substrate G may be a non-catalyst substrate at least partially comprising a material that is configured to not be a catalyst (e.g., is configured to not act as a catalyst) for growing graphene. For example, the substrate G may include at least one of a Group IV semiconductor material, a semiconductor compound, or an insulating material. As a specific example, the Group IV semiconductor material may include Si, Ge, or Sn. In another example, the semiconductor compound may include a material that includes a combination of at least two elements of, for example, Si, Ge, C, Zn, Cd, Al, Ga, In, B, C, N, P, S, Se, As, Sb, or Te.

The insulating material may include at least one of Si, Al, Hf, Zr, Zn, Ti, Ta, W, or Mn or at least one oxide, nitride, carbide of at least one of Si, Ni, Al, W, Ru, Co, Mn, Ti, Ta, Au, Hf, Zr, Zn, Y, Cr, Cu, Mo, or Gd, or a derivative of the oxide, nitride, or carbide. At least one of the oxide, nitride, carbide, or a derivative thereof may further include H. The substrate G may further include a dopant.

Next, a surface (e.g., surface G1) of the substrate G is pre-treated based on supplying a gas into the reaction chamber (S620). Such pre-treating may include injecting a gas for pretreating the substrate G into the reaction chamber 100. As an example, a reducing gas as a gas for pretreatment may be held in the third gas supply source 433 and may be injected from a plurality of nozzle units 431 included in the third gas supply unit 430. Accordingly, pre-treating the surface G1 of the substrate G may be based on supplying a reducing gas into the reaction chamber 100. According to some example embodiments, the reducing gas may include, for example, at least one of hydrogen, nitrogen, chlorine, fluorine, ammonia, or derivatives thereof. However, some example embodiments are not limited thereto. In addition, an inert gas may be additionally injected into the reaction chamber 100 in addition to the reducing gas. Here, the inert gas may include, for example, at least one of argon gas, neon gas, helium gas, krypton gas, or xenon gas. In FIG. 2, it is depicted that hydrogen gas is used as a reducing gas.

As an example, the hydrogen gas injected from the plurality of nozzle units 431 may be injected into the reaction chamber 100 (e.g., into interior 101) at a third height $h_3$ from the upper surface of the substrate supporter 200 (e.g., from upper surface 210a) according to some example embodiments. In some example embodiments, a ratio of the third height $h_3$ at which the plurality of nozzle units 431 are disposed (e.g., are located) inside the reaction chamber 100 (e.g., within interior 101) to the second height $h_2$ at which the injection plate 421 is disposed (e.g., is located) inside the reaction chamber 100 (e.g., within interior 101) may be greater than 0 and equal to or less than about 0.9. Accordingly, the ratio of the third height $h_3$ at which the reducing gas is supplied into the reaction chamber 100 via the third gas supply unit 430 (e.g., via nozzle units 431) may be greater than 0 and equal to or less than about 0.9. Also, according to some example embodiments, a flow rate of the hydrogen gas injected from the plurality of nozzle units 431 may be greater than or equal to about 0.1 sccm and less than or equal to about 100 sccm. As described above, the plurality of nozzle units 431 are disposed at a particular (or, in some example embodiments, predetermined) height, for example the third height $h_3$ as described herein, which may be independent of the first height $h_1$ at which an inert gas is supplied into the reaction chamber 100 and/or the second height $h_2$ at which a carbon source is supplied into the reaction chamber 100. The hydrogen gas injected from the plurality of nozzle units 431 may be injected to have a particular (or, in some example embodiments, predetermined) flow rate, and thus, the hydrogen gas may form a laminar flow having a particular (or, in some example embodiments, predetermined) height. Accordingly, while the hydrogen gas injected from the plurality of nozzle units 431 (e.g., nozzles) moves toward the substrate G to contact the substrate G, the contact between the hydrogen gas and the sidewall of the reaction chamber 100 is reduced or minimized, and thus, the generation of unnecessary fine particles may be reduced or minimized.

Next, a bias is applied to the substrate G through the bias electrode unit 240, also referred to herein as a bias electrode (S630). The bias applied to the substrate G may be, for example, an RF bias or a DC bias. Accordingly, a particular (or, in some example embodiments, predetermined) (+) bias voltage or a (−) bias voltage may be applied to the substrate G. To this end, bias power of a particular (or, in some example embodiments, predetermined) size may be applied to the substrate G. For example, the bias power applied to the substrate G in the pretreatment process of the substrate G may be in a range of about 1 W to about 300 W. However, the bias power is an example, and the bias power applied to the substrate G may be variously modified.

Referring to FIGS. 3A and 3B, plasma power may be applied to the inside of the reaction chamber 100 concurrently with a bias being applied to the substrate G, for example based on controller 700 controlling the plasma generator 300, such that a gas plasma (for example, hydrogen plasma) may be generated inside the reaction chamber 100 (S640). The bias power applied to the substrate G may be in a range of about 1 W to about 300 W. As described above, when a gas plasma is generated inside the reaction chamber 100 while a bias is applied to the substrate G, at least one of the particular (or, in some example embodiments, predetermined) charges 141 or the activation site 142 may be formed on the surface G1 of the substrate G.

For example, (+) charges 141 may be formed on the surface G1 of the substrate G in a state that (e.g., when) a (−) bias voltage is applied to the substrate G. Also, (−) charges may be formed on the surface G1 of the substrate G in a state that a (+) voltage is applied to the substrate G. The activation site 142 may be formed by electric charges moving toward the substrate G and colliding with the surface on the substrate G. The activation site 142 may include, for example, roughness or defects. In FIG. 3B, roughness is depicted as an example of the activation site 142.

The charges 141 and the activation site 142 may enable activated carbon to be effectively adsorbed on the surface G1 of the substrate (G), and graphene (P) may be formed based on directly growing on the surface G1 of the substrate (G) even at a low temperature that is equal to or less than about 400° C. (S660).

Figure 4:
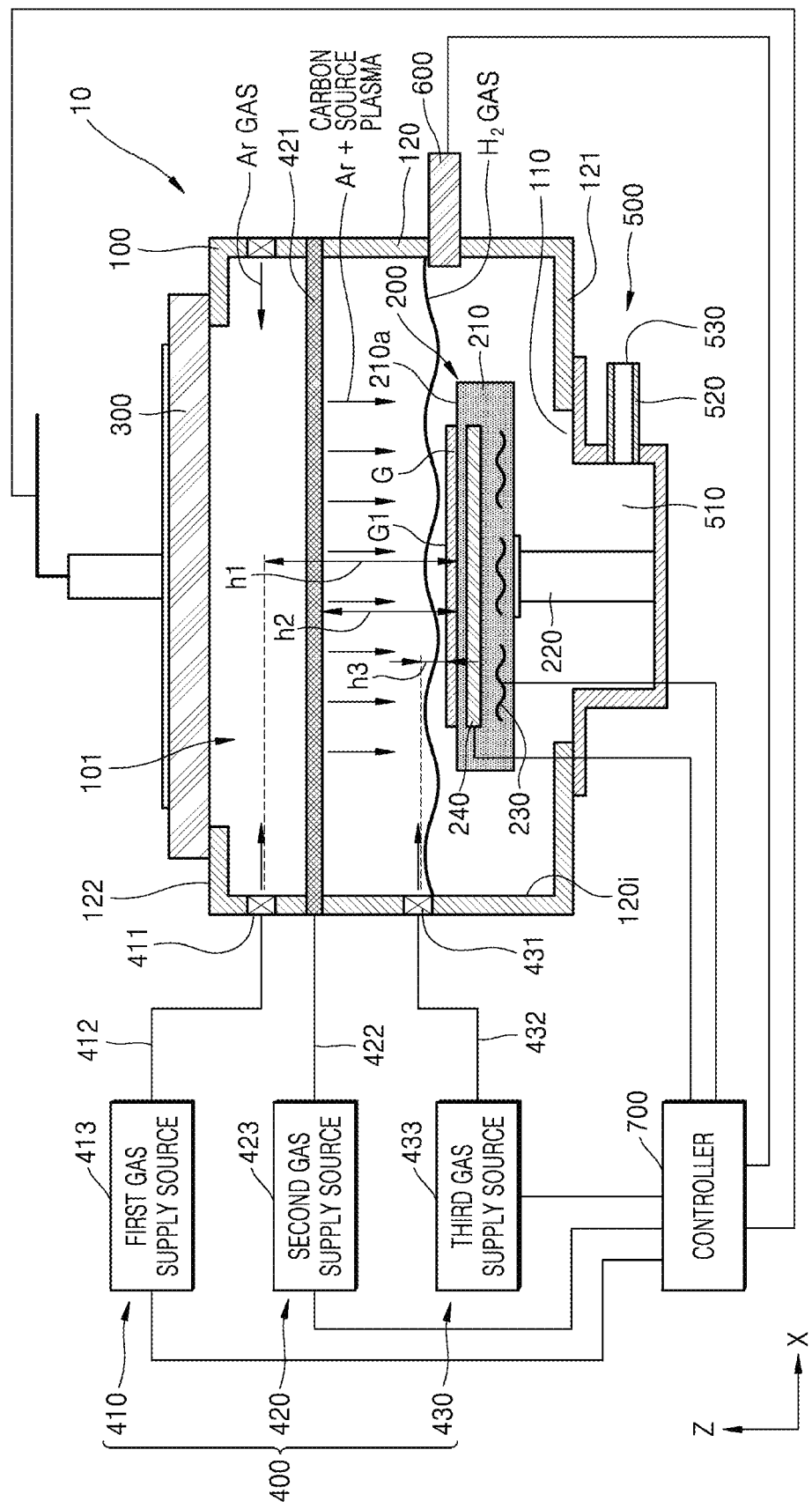
FIG. 4 is a schematic diagram of a graphene manufacturing apparatus according to some example embodiments.
Figure 5A:
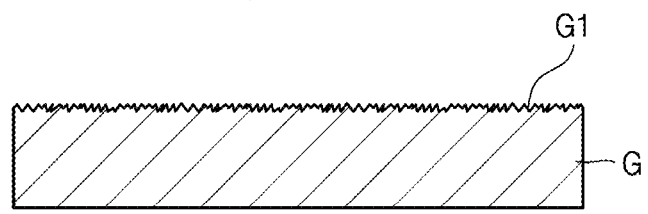
FIGS. 5A and 5B are diagrams for explaining a pretreatment process of graphene according to some example embodiments.
Figure 5B:
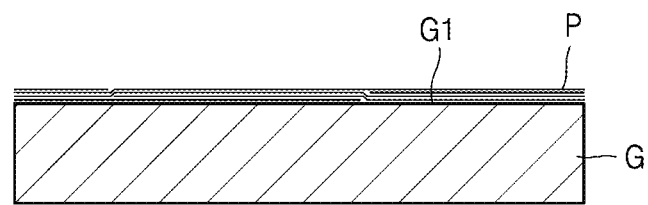

FIG. 4 is a schematic diagram of a graphene manufacturing apparatus according to some example embodiments. FIGS. 5A and 5B are diagrams for explaining a pretreatment process of graphene according to some example embodiments.

After the pretreatment process of the substrate G is completed, as shown in FIG. 4, a reaction gas for growing graphene P is injected into the reaction chamber 100 (S635), and then, power for plasma generation is applied to the inside (e.g., interior 101) of the reaction chamber 100, for example based on the controller 700 controlling the plasma generator 300 to apply the power for plasma generator to the interior 101 (S640).

Specifically, first, a reaction gas for the growing graphene P is injected into the reaction chamber 100 (S635). The reaction gas may include a carbon source gas, an inert gas, and a reducing gas. The carbon source gas may be interchangeably referred to herein as a carbon source and/or a carbon gas. In some example embodiments, the inert gas may be supplied to the interior 101 of the reaction chamber 100 through (e.g., based on operation of) the first gas supply unit 410, the carbon source gas may be supplied to the interior 101 of the reaction chamber 100 through the second gas supply unit 420, and the reducing gas may be supplied to the interior 101 of the reaction chamber 100 through the third gas supply unit 430. That is, the three kinds of reaction gases may be supplied to the interior of the reaction chamber 100 through different supply units.

According to some example embodiments, the inert gas may include, for example, at least one of argon gas, neon gas, nitrogen gas, helium gas, krypton gas, or xenon gas. In FIG. 4, it is depicted as an example that an argon gas is used as an inert gas. At this time, at least a portion of the first gas supply unit 410 (e.g., first gas discharge holes 411) may be disposed (e.g., located) between an upper wall 122 of the reaction chamber 100 and the second gas supply unit 420, which will be described later.

The carbon source (e.g., carbon gas, carbon source gas, etc.) according to some example embodiments may include a hydrocarbon having an ionization energy equal to less than about 10.6 eV, for example a range between about 1.2 eV and about 10.6 eV, and the hydrocarbon may include a liquid precursor in a liquid state at room temperature. In addition, the liquid precursor may be a molecular precursor containing one or more aromatic molecular rings, such as benzene, toluene, xylene, methylene, etc. or may be a precursor in which a functional group is included in a molecule having one or more aromatic molecular rings, such as chlorobenzene and anisole. In some example embodiments, the carbon source may include a molecular precursor including three or more aliphatic carbon bonds, such as propane, propene, butane, hexane, octane, cyclohexane, etc. and a precursor including a functional group, such as oxygen, nitrogen, and sulfur, etc. However, the carbon source is an example, and may be any hydrocarbon having an ionization energy of 10.6 eV or less. At this point, the second gas supply unit 420 may be disposed between the first gas supply unit 410 and the third gas supply unit 430. Also, for example, the second gas supply unit 420 may include an injection plate 421 disposed to traverse the interior of the reaction chamber 100. Accordingly, a carbon source gas may be supplied into the reaction chamber 100 by using the injection plate 421.

A reducing gas according to some example embodiments may be, for example, hydrogen gas, and the third gas supply unit 430 may include a plurality of nozzle units 431. A process of discharging hydrogen gas from the plurality of nozzle units 431 is the same or substantially the same as the pretreatment process described with reference to FIG. 2, and thus, the description thereof will be omitted.

Next, power for plasma generation is applied to the reaction chamber 100 from the plasma generator 300 (S640). Here, the power for generating plasma may be in a range of about 10 W to about 4000 W. The plasma generator 300 may be, for example, at least one RF plasma generator or at least one MW plasma generator. In some example embodiments, the directly growing of graphene P on the substrate G (e.g., directly on surface G1) may be performed at a temperature (e.g., process temperature) in the reaction chamber 100 (e.g., a temperature of elements within interior 101) that is equal to or less than about 700° C. For example, the process temperature may be in a range of equal to or greater than about 200° C. and equal to or less than about 700 ° C. In some example embodiments, the directly growing of graphene P on the substrate G (e.g., directly on surface G1) may be performed at a pressure (e.g., process pressure) in the reaction chamber 100 (e.g., a pressure within interior 101) that is equal to or less than about 10 Torr. For example, the process pressure may be in a range of equal to or greater than about 0.001 Torr and equal to or less than about 10 Torr.

When power for generating plasma is applied to the reaction chamber 100 from the plasma generator 300, an electric field may be induced inside the reaction chamber 100. When an electric field is induced in a state that the reaction gas is injected as described above (e.g., inside the reaction chamber 100 subsequently to the reaction gas being injected into the reaction chamber 100, for example into the interior thereof 101), plasma for growing graphene P is formed. It will be understood that operations S635 and S640 may be performed in a different order than shown in FIG. 6, for example S635 may be performed after S640 is started, and/or S635 and S640 may be performed concurrently (e.g., simultaneously).

Plasma of an inert gas of the reaction gases produces activated carbon from a carbon source (e.g., the carbon source gas injected into the reaction chamber 100). The generated activated carbon is adsorbed on an exposed surface of the substrate (e.g., the upper surface G1 of the substrate G), thereby activating the surface G1 of the substrate G (S660). In addition, the plasma of the inert gas continuously induces the activation of the substrate G, and the charges and the activation site may accelerate the adsorption of activated carbon on the surface G1 of the substrate G. Since the ionization energy of the carbon source is as low as about 10.6 eV, the generation of activated carbon is easy at a low temperature, for example, at a temperature of about 400° C. or less, and thus, graphene P may be formed by directly growing on the surface G1 of the substrate (G) (e.g., the graphene is directly grown on the surface G1). Accordingly, it will be understood that the graphene P may be directly grown on at least one surface G1 of the substrate G (e.g., an exposed surface that is exposed from the substrate supporter 200) based on supplying a reaction gas (e.g., the carbon source gas, the inert gas, and the reducing gas) into the reaction chamber 100 (e.g., into interior 101) and applying power to the reaction chamber 100 from the plasma generator 300 to generate a plasma within the reaction chamber 100 (e.g., in interior 101) in which the reaction gas has been injected and is present during the application of power, according to a plasma enhanced chemical vapor deposition (PECVD) process, wherein the reducing gas has an ionization energy equal to or less than about 10.6 eV.

As shown in FIG. 6, some or all of S630-S660 may collectively comprise directly growing graphene on the surface G1 of the substrate G based on supplying the carbon source, the inert gas, and the reducing gas(e.g., collectively, the reaction gas) into the reaction chamber in a plasma enhanced chemical vapor deposition (PECVD) process (S690). The reducing gas may have an ionization energy equal to or less than about 10.6 eV. It will be understood that S690 may omit one or more of S630-S660 as shown in FIG. 6 and/or may include one or more additional operations not show as being part of S690 in FIG. 6. It will be understood that operations of S690 may be performed in a different order than shown in FIG. 6; for example, two or more of S630-660 may be performed concurrently.

Referring to FIGS. 5A and 5B, as described above, as the generation of the activated carbon on the surface G1 of the substrate G is accelerated, graphene P may be formed within a short time on the surface G1 of the substrate G.

Graphene P may be grown at a relatively fast rate on the surface G1 of the substrate G. For example, graphene P may be grown to a desired thickness in a relatively short time, for example, 30 minutes or less (more specifically, about 10 minutes or less). In this way, graphene P may be formed to a desired thickness on the surface G1 of the substrate G within a relatively short time. The graphene P formed in this way may have a single-layer or multi-layer structure.

According to some example embodiments, after pretreating the surface G1 of the substrate G by using a reducing gas (e.g., S620), graphene P is grown on the pretreated surface G1 of the substrate G (e.g., S690), and thus, relatively high-quality graphene P may be obtained even at a low temperature.

According to some example embodiments, the generation of impurities that may be generated from a graphene manufacturing apparatus may be prevented, and thus, the occurrence of cracks, pinholes, overlayers, etc. in a graphene layer may be prevented.

Graphene may be readily grown even at a low temperature by using a carbon source with low ionization energy.

Charges and activation sites generated in a pretreatment process may accelerate the growing of graphene, and thus, graphene may be formed in a short time.

It should be understood that example embodiments described herein should be considered in a descriptive sense only and not for purposes of limitation. Descriptions of features or aspects within each example embodiment should typically be considered as available for other similar features or aspects in other example embodiments. While some example embodiments have been described with reference to the figures, it will be understood by those of ordinary skill in the art that various changes in form and details may be made therein without departing from the spirit and scope as defined by the following claims.

What is claimed is:

1. A graphene manufacturing apparatus, comprising:
 a reaction chamber;
 a substrate supporter inside the reaction chamber, the substrate supporter configured to structurally support a substrate inside the reaction chamber;
 a plasma generator configured to generate a plasma inside the reaction chamber;
 a first gas supply configured to supply an inert gas into the reaction chamber at a first height from an upper surface of the substrate supporter in a height direction of the reaction chamber;
 a second gas supply configured to supply a carbon source into the reaction chamber at a second height from the upper surface of the substrate supporter in the height direction of the reaction chamber; and
 a third gas supply configured to supply a reducing gas into the reaction chamber at a third height from the upper surface of the substrate supporter in the height direction of the reaction chamber,
 wherein the first height is greater than the second height, and the second height is greater than the third height.

2. The graphene manufacturing apparatus of claim 1, wherein a ratio of the third height to the second height is greater than 0 and less than about 0.9.

3. The graphene manufacturing apparatus of claim 1, wherein the third gas supply is configured to supply the reducing gas into the reaction chamber at a flow rate that is greater than or equal to about 0.1 sccm and less than or equal to about 100 sccm.

4. The graphene manufacturing apparatus of claim 1, wherein the reducing gas includes hydrogen gas.

5. The graphene manufacturing apparatus of claim 1, wherein the plasma generator includes a radio frequency (RF) plasma generator or a microwave (MW) plasma generator.

6. The graphene manufacturing apparatus of claim 1, wherein the second gas supply includes an injection plate that traverses an interior of the reaction chamber.

7. The graphene manufacturing apparatus of claim 1, wherein the third gas supply includes a plurality of nozzles spaced apart from each other at particular intervals along a sidewall of the reaction chamber.

8. The graphene manufacturing apparatus of claim 1, wherein the carbon source includes a hydrocarbon having an ionization energy of equal to or less than about 10.6 eV.

9. The graphene manufacturing apparatus of claim 1, wherein the first gas supply includes a shower ring extending in a ring shape along a sidewall of the reaction chamber.

10. The graphene manufacturing apparatus of claim 3, further comprising:
 processing circuitry configured to control the flow rate of the reducing gas, wherein the reducing gas has a laminar flow at the flow rate.

11. The graphene manufacturing apparatus of claim 1, further comprising:
 a heater configured to generate heat that is transmitted to the substrate structurally supported by the substrate supporter.

12. A method of forming graphene based on using the graphene manufacturing apparatus of claim 1, the method comprising:
 placing a non-catalyst substrate inside the reaction chamber such that the non-catalyst substrate is structurally supported on the upper surface of the substrate supporter, the non-catalyst substrate including a material that is configured to not act as a catalyst for growing graphene;
 pre-treating a surface of the non-catalyst substrate based on supplying the reducing gas into the reaction chamber; and
 directly growing graphene on a surface of the non-catalyst substrate based on supplying the carbon source, the inert gas, and the reducing gas into the reaction chamber in a plasma enhanced chemical vapor deposition (PECVD) process that includes generating a plasma inside the reaction chamber, wherein the reducing gas has an ionization energy equal to or less than about 10.6 eV.

13. The method of claim 12, wherein a ratio of the third height to the second height is greater than 0 and less than 0.9.

14. The method of claim 12, wherein the reducing gas is supplied to the reaction chamber at a flow rate that is greater than or equal to about 0.1 sccm and less than or equal to about 100 sccm.

15. The method of claim 12, wherein the reducing gas includes a hydrogen gas.

16. The method of claim 12, wherein the plasma is generated based on using a radio frequency (RF) plasma generator or a microwave (MW) plasma generator.

17. The method of claim 12, wherein the non-catalyst substrate includes at least one of a Group IV semiconductor material, a semiconductor compound, a metal, or an insulating material.

18. The method of claim 12, wherein the pre-treating of the surface of the non-catalyst substrate includes forming at least one of charges or an activation site that induces adsorption of activated carbon on the surface of the non-catalyst substrate.

19. The method of claim 12, wherein the directly growing of graphene is performed at a pressure equal to or less than about 10 Torr.

20. The method of claim 12, wherein the directly growing of graphene is performed at a process temperature equal to or less than about 700° C.

* * * * *